(12) United States Patent
Parrish et al.

(10) Patent No.: US 11,242,019 B2
(45) Date of Patent: Feb. 8, 2022

(54) COOLING AND LUBRICATION SYSTEM FOR A MOTOR VEHICLE DRIVE UNIT

(71) Applicant: GM Global Technology Operations LLC, Detroit, MI (US)

(72) Inventors: Robert Parrish, White Lake, MI (US); Nathaniel J. Diroff, Southfield, MI (US); Vijay A. Neelakantan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 792 days.

(21) Appl. No.: 16/156,597

(22) Filed: Oct. 10, 2018

(65) Prior Publication Data
US 2020/0114848 A1    Apr. 16, 2020

(51) Int. Cl.
| B60R 17/02 | (2006.01) |
| F16N 7/38 | (2006.01) |
| F16N 13/00 | (2006.01) |
| H02K 9/19 | (2006.01) |
| F16N 39/02 | (2006.01) |
| F16N 39/06 | (2006.01) |
| F16N 23/00 | (2006.01) |

(52) U.S. Cl.
CPC .............. *B60R 17/02* (2013.01); *F16N 7/385* (2013.01); *F16N 13/00* (2013.01); *F16N 23/00* (2013.01); *F16N 39/02* (2013.01); *F16N 39/06* (2013.01); *H02K 9/19* (2013.01); *F16N 2210/04* (2013.01)

(58) Field of Classification Search
CPC ......... B60R 17/02; F16N 7/385; F16N 13/00; F16N 39/02; F16N 23/00; F16N 2210/04; F16N 39/06; H02K 9/19; F16H 57/0441; F16H 57/0476
See application file for complete search history.

(56) References Cited

U.S. PATENT DOCUMENTS

| 9,988,955 B1 | 6/2018 | Suwa et al. | |
| 2015/0167836 A1* | 6/2015 | Long | B60K 6/12 60/428 |
| 2019/0120369 A1* | 4/2019 | Staake | F16H 57/0476 |
| 2020/0114848 A1* | 4/2020 | Parrish | F16N 23/00 |
| 2020/0208543 A1* | 7/2020 | Turuvekere Gurudatt | B22F 10/20 |
| 2020/0284165 A1* | 9/2020 | Kempers | F02C 7/14 |
| 2021/0270361 A1* | 9/2021 | Maurer | F16H 57/0435 |
| 2021/0334194 A1* | 10/2021 | Xiao | G06F 11/3688 |

* cited by examiner

*Primary Examiner* — Michael R Mansen
*Assistant Examiner* — Mark K Buse
(74) *Attorney, Agent, or Firm* — Vivacqua Crane PLLC (57) ABSTRACT

A cooling and lubrication system for a motor vehicle drive unit includes a drive unit sump, a first mechanically-driven pump, a second mechanically-driven pump, and an oil/air separator reservoir, among other possible components. The drive unit sump holds drive unit fluid. The first mechanically-driven pump fluidly communicates with the drive unit sump, and the second mechanically-driven pump fluidly communicates with the drive unit sump. The oil/air separator reservoir resides downstream of the first mechanically-driven pump and resides downstream of the second mechanically-driven pump.

20 Claims, 5 Drawing Sheets

COOLING AND LUBRICATION SYSTEM FOR A MOTOR VEHICLE DRIVE UNIT

INTRODUCTION

The present disclosure relates to motor vehicle propulsion systems, and more particularly relates to cooling and lubrication systems for motor vehicle drive units equipped in motor vehicle propulsion systems.

In general, motor vehicle drive units are equipped in certain motor vehicle propulsion systems—such as those found in automotive hybrid electric vehicle (HEV) applications—in order to furnish torque in the larger propulsion systems. In some instances motor vehicle drive units include electric traction motors and transmission components like shafts, gears, and bearings that can generate heat and move and engage one another amid their use. Cooling and lubrication systems are hence conventionally outfitted in motor vehicle drive units for cooling and lubrication purposes, and ultimately for more efficient and effective operation of the units.

SUMMARY

In an embodiment, a cooling and lubrication system for a motor vehicle drive unit may include a drive unit sump, a first mechanically-driven pump, a second mechanically-driven pump, a heat exchanger, and an oil/air separator reservoir. The drive unit sump holds drive unit fluid. The first mechanically-driven pump fluidly communicates with the drive unit sump, and the second mechanically-driven pump also fluidly communicates with the drive unit sump. The heat exchanger resides downstream of the first mechanically-driven pump, and resides downstream of the second mechanically-driven pump. The oil/air separator reservoir resides downstream of the first mechanically-driven pump, and resides downstream of the second mechanically-driven pump. In one state of operation amid use of the cooling and lubrication system, the first and second mechanically-driven pumps draw drive unit fluid from the drive unit sump. The drawn drive unit fluid is delivered through the heat exchanger and is delivered to an electric traction motor of the motor vehicle drive unit for cooling purposes. Further, the first and second mechanically-driven pumps draw drive unit fluid from the drive unit sump. The drawn drive unit fluid is delivered to the oil/air separator reservoir. At the oil/air separator reservoir, separated drive unit fluid is fed downstream of the oil/air separator reservoir to components of the motor vehicle drive unit for lubrication purposes.

In an embodiment, in another state of operation amid use of the cooling and lubrication system, the first mechanically-driven pump draws air or a mixture of drive unit fluid and air from the drive unit sump. The drawn air or drawn mixture is delivered to the oil/air separator reservoir, and the drawn air or drawn mixture is substantially precluded from delivery to the electric traction motor.

In an embodiment, the second mechanically-driven pump draws drive unit fluid from the drive unit sump. The drawn drive unit fluid is delivered through the heat exchanger and to the electric traction motor for cooling purposes. Further, the drawn drive unit fluid is delivered to the oil/air separator reservoir. At the oil/air separator reservoir, separated drive unit fluid is fed downstream of the oil/air separator reservoir to components of the motor vehicle drive unit for lubrication purposes.

In an embodiment, in another state of operation amid use of the cooling and lubrication system, the first and second mechanically-driven pumps lack driving. At the oil/air separator reservoir, separated drive unit fluid from the oil/air separator reservoir is fed to components of the motor vehicle drive unit for lubrication purposes, and is fed to the electric traction motor of the motor vehicle drive unit for cooling purposes.

In an embodiment, drive unit fluid that is overflowed from the oil/air separator is fed back to the drive unit sump.

In an embodiment, the separated drive unit fluid is fed downstream of the oil/air separator reservoir to components of the motor vehicle drive unit for lubrication purposes by way of gravity and absent a dedicated pump therefor.

In an embodiment, the first mechanically-driven pump and second mechanically-driven pump are the sole pumps that fluidly communicate with the drive unit sump in the cooling and lubrication system.

In an embodiment, the cooling and lubrication system may further include an electric pump that fluidly communicates with the drive unit sump. The electric pump draws drive unit fluid for delivery through the heat exchanger and to the electric traction motor of the motor vehicle drive unit for cooling purposes. The electric pump is operated in order to augment the delivery of drive unit fluid to the electric traction motor.

In an embodiment, the separated drive unit fluid is fed downstream of the oil/air separator reservoir to the electric traction motor of the motor vehicle drive unit for cooling purposes. The separated drive unit fluid is fed to the electric traction motor by way of gravity and absent a dedicated pump that would be employed therefor.

In an embodiment, the cooling and lubrication system may further include a first check valve, a second check valve, a first throttle valve, and a second throttle valve. The first check valve resides downstream of the first mechanically-drive pump and resides upstream of the heat exchanger. The first check valve selectively permits delivery of the drawn drive unit fluid through the heat exchanger and to the electric traction motor of the motor vehicle drive unit for cooling purposes. The second check valve resides downstream of the second mechanically-drive pump and resides upstream of the heat exchanger. The second check valve selectively permits delivery of the drawn drive unit fluid through the heat exchanger and to the electric traction motor of the motor vehicle drive unit for cooling purposes. The first throttle valve resides downstream of the first mechanically-driven pump and resides upstream of the oil/air separator reservoir. The first throttle valve permits delivery of drawn drive unit fluid, air, or a mixture of drive unit fluid and air to the oil/air separator reservoir. The second throttle valve resides downstream of the second mechanically-driven pump and resides upstream of the oil/air separator reservoir. The second throttle valve permits delivery of drawn drive unit fluid, air, or a mixture of drive unit fluid and air to the oil/air separator reservoir.

In an embodiment, the cooling and lubrication system may further include filter and a pressure regulator valve. The filter resides downstream of the first check valve and second check valve, and resides upstream of the heat exchanger. The pressure regulator valve resides downstream of the filter and resides downstream of the heat exchanger. The pressure regulator valve resides upstream of the drive unit sump.

In an embodiment, a cooling and lubrication system for a motor vehicle drive unit may include a drive unit sump, a first mechanically-driven pump, a second mechanically-driven pump, and an oil/air separator reservoir. The drive unit sump holds drive unit fluid. The first mechanically-driven pump fluidly communicates with the drive unit sump, and the second mechanically-driven pump also fluidly communicates with the drive unit sump. The oil/air separator reservoir resides downstream of the first mechanically-driven pump, and resides downstream of the second mechanically-driven pump. In one state of operation amid use of the cooling and lubrication system, the first mechanically-driven pump draws air or a mixture of drive unit fluid and air from the drive unit sump. The drawn air or drawn mixture is substantially precluded from delivery to an electric traction motor of the motor vehicle drive unit. The second mechanically-driven pump draws drive unit fluid from the drive unit sump. The drawn drive unit fluid is delivered through a heat exchanger and to the electric traction motor for cooling purposes.

In an embodiment, drive unit fluid that is separated from the oil/air separator reservoir is fed downstream of the oil/air separator reservoir to components of the motor vehicle drive unit for lubrication purposes, to the electric traction motor for cooling purposes, or to both of the components and electric traction motor for respective lubrication and cooling purposes.

In an embodiment, the separated drive unit fluid is fed downstream of the oil/air separator reservoir by way of gravity and absent a dedicated pump that would be employed therefor.

In an embodiment, in another state of operation amid use of the cooling and lubrication system, the first and second mechanically-driven pumps draw drive unit fluid from the drive unit sump. The drawn drive unit fluid is delivered through the heat exchanger and to the electric traction motor for cooling purposes. Further, the first and second mechanically-driven pumps draw drive unit fluid from the drive unit sump. The drawn drive unit fluid is delivered to the oil/air separator reservoir.

In an embodiment, in another state of operation amid use of the cooling and lubrication system, the first and second mechanically-driven pumps lack driving and separated drive unit fluid from the oil/air separator reservoir is fed to components of the motor vehicle drive unit for lubrication purposes and is fed to the electric traction motor of the motor vehicle drive unit for cooling purposes.

In an embodiment, the cooling and lubrication system may further include a first check valve, a second check valve, a first throttle valve, and a second throttle valve. The first check valve resides downstream of the first mechanically-drive pump and resides upstream of the heat exchanger. The second check valve resides downstream of the second mechanically-drive pump and resides upstream of the heat exchanger. The first throttle valve resides downstream of the first mechanically-driven pump and resides upstream of the oil/air separator reservoir. The second throttle valve resides downstream of the second mechanically-driven pump and resides upstream of the oil/air separator reservoir.

In an embodiment, the cooling and lubrication system may further include an electric pump that fluidly communicates with the drive unit sump. The electric pump draws drive unit fluid for delivery through the heat exchanger and to the electric traction motor of the motor vehicle drive unit for cooling purposes.

In an embodiment, a motor vehicle drive unit includes the cooling and lubrication system.

In an embodiment, a cooling and lubrication system for a motor vehicle drive unit may include a drive unit sump, a first mechanically-driven pump, a second mechanically-driven pump, a heat exchanger, an oil/air separator reservoir, a first check valve, a second check valve, a first throttle valve, and a second throttle valve. The drive unit sump holds drive unit fluid. The first mechanically-driven pump fluidly communicates with the drive unit sump, and the second mechanically-driven pump also fluidly communicates with the drive unit sump. The heat exchanger resides downstream of the first mechanically-driven pump, and resides downstream of the second mechanically-driven pump. The oil/air separator reservoir resides downstream of the first mechanically-driven pump, and resides downstream of the second mechanically-driven pump. The first check valve resides downstream of the first mechanically-drive pump and resides upstream of the heat exchanger. The second check valve resides downstream of the second mechanically-drive pump and resides upstream of the heat exchanger. The first throttle valve resides downstream of the first mechanically-driven pump and resides upstream of the oil/air separator reservoir. The second throttle valve resides downstream of the second mechanically-driven pump and resides upstream of the oil/air separator reservoir. Amid use of the cooling and lubrication system, drive unit fluid that is separated from the oil/air separator reservoir is fed downstream of the oil/air separator reservoir to components of the motor vehicle drive unit for lubrication purposes, to an electric traction motor of the motor vehicle drive unit for cooling purposes, or to both of the components and electric traction motor for respective lubrication and cooling purposes. The separated drive unit fluid is fed downstream of the oil/air separator reservoir by way of gravity and absent a dedicated pump that would be employed therefor.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

With reference to the figures, a cooling and lubrication system 10 for a motor vehicle drive unit efficiently and effectively carries out its cooling and lubrication functionalities with, in an embodiment, a pair of mechanical pumps and a minimized sump volume of cooling and lubrication fluid. In this regard, the cooling and lubrication system 10 escapes certain drawbacks associated with electric pumps, and the motor vehicle drive unit more readily satisfies packaging demands which can oftentimes be inflexible in certain applications, such as in automotive applications. Moreover, the cooling and lubrication system 10 is designed and constructed to appropriate an air elimination circuit in the system for useful cooling and lubrication purposes, hence lessening the attendant parasitic loss that might otherwise occur and measurably enhancing efficiencies in the system. Furthermore, and among other advancements described elsewhere and that may be experienced in application, the cooling and lubrication system 10 in an embodiment can provide its cooling and lubrication functionalities in the motor vehicle drive unit even when movement of the accompanying vehicle is halted and the mechanical pumps are temporarily not pumping. The cooling and lubrication system 10 is described below in the context of an automotive application, yet could be equipped in non-automotive applications as well.

As used herein, the terms downstream and upstream are employed with reference to fluid flow in the cooling and lubrication system 10, such that downstream refers to a direction that is with fluid flow travel, and upstream refers to a direction that is opposite or against the direction of fluid flow travel.

The cooling and lubrication system 10 provides cooling and lubrication functionalities in a motor vehicle drive unit. The cooling and lubrication system 10 can have various designs, constructions, and components in different embodiments dictated in part or more by the design, construction, and components of the motor vehicle drive unit in which the system is outfitted in. As known by skilled artisans, the cooling and lubrication system 10 can be incorporated into the construction and structural housing of the larger motor vehicle drive unit. In the embodiment presented by FIGS. 1-4, the cooling and lubrication system 10 includes a drive unit sump 12, a first mechanically-driven pump 14, a second mechanically-driven pump 16, a first check valve 18, a second check valve 20, a first throttle valve 22, a second throttle valve 24, a heat exchanger 26, and an oil/air separator reservoir 28; still, in other embodiments the cooling and lubrication system 10 could have more, less, and/or different components than those described here and elsewhere.

The drive unit sump 12 collects and provisionally holds drive unit fluid 30 that is employed for cooling and lubricating components and parts of the motor vehicle drive unit. Compared to some previously-known sumps, the drive unit sump 12 can possess a minimized sump volume and can have a shallower depth and smaller size for the drive unit fluid 30—this is brought about by the design and construction and components of the cooling and lubrication system 10, as described herein. The minimized sump volume enables the motor vehicle drive unit to more readily satisfy overall packaging demands in a particular application compared to larger sump volumes and deeper sump depths. In automotive applications, for example, packaging demands can be exacting and even inflexible, and hence reduced sump volumes can provide packaging benefits for the motor vehicle drive unit and for the larger assembly and installation. Further, a magnet 32 can be disposed in the drive unit sump 12 in order to attract and remove ferrous debris from the drive unit fluid 30, if such debris is present. And, the drive unit sump 12 can be furnished with atmospheric bi-directional ventilation 34 in some embodiments.

The first mechanically-driven pump 14 fluidly communicates with the drive unit sump 12 and draws drive unit fluid 30 out of the drive unit sump 12 and downstream to other locations of the cooling and lubrication system 10. The first mechanically-driven pump 14 can be a mechanical pump of various mechanical types, depending on the particular application. In the example presented here, the first mechanically-driven pump 14 is driven and compelled to operate by an engine of the associated vehicle that is external to the motor vehicle drive unit, such as an internal combustion engine. The first mechanically-driven pump 14 can be operated in forward and reverse modes to draw drive unit fluid 30 out of and into the drive unit sump 12, as demanded. The first mechanically-driven pump 14 can be sized such that it alone possesses the capacity to draw and deliver a suitable amount of drive unit fluid 30 to the cooling and lubrication system 10 in the event that the second mechanically-driven pump 16 lacks reach to drive unit fluid 30 and its inlet is not covered by drive unit fluid 30 for pumping. An inlet 36 of the first mechanically-driven pump 14 is situated at a lower region of the drive unit sump 12 and serves as a pick-up for drive unit fluid 30. The inlet 36 can have a screen 38 or other type of filter installed thereat.

Like the first mechanically-driven pump 14, the second mechanically-driven pump 16 fluidly communicates with the drive unit sump 12 and draws drive unit fluid 30 out of the drive unit sump 12 and downstream to other locations of the cooling and lubrication system 10. The second mechanically-driven pump 16 can be a mechanical pump of various mechanical types, depending on the particular application. In the example presented here, the second mechanically-driven pump 16 is driven and compelled to operate by an engine of the associated vehicle that is external to the motor vehicle drive unit, such as an internal combustion engine. The second mechanically-driven pump 16 can be operated in forward and reverse modes to draw drive unit fluid 30 out of and into the drive unit sump 12, as demanded. The second mechanically-driven pump 16 can be sized such that it alone possesses the capacity to draw and deliver a suitable amount of drive unit fluid 30 to the cooling and lubrication system 10 in the event that the first mechanically-driven pump 14 lacks reach to drive unit fluid 30 and its inlet 36 is not covered by drive unit fluid 30 for pumping. An inlet 40 of the second mechanically-driven pump 16 is situated at a lower region of the drive unit sump 12 and serves as a pick-up for drive unit fluid 30. The inlet 40 can be displaced from the inlet 36 of the first mechanically-driven pump 14 for access to drive unit fluid 30 at another section of the lower region in the drive unit sump 12. The inlet 40 can have a screen 42 or other type of filter installed thereat.

Employing mechanical pumps in the cooling and lubrication system 10—namely, the first and second mechanically-driven pumps 14, 16—rather than electric pumps serves to sidestep certain drawbacks that come as a consequence of using electric pumps. For one, electric pumps typically have a higher cost compared to mechanical pumps. And the absence of electric pumps means the absence of failure modes that accompany use of electric pumps. Moreover, the concomitant inefficiencies present when converting electric and magnetic energies are removed when electric pumps are not employed. Still, electric pumps can indeed be employed in the cooling and lubrication system 10 in other embodiments, as demonstrated by the embodiment of FIG. 5 and subsequently described.

The first check valve 18 resides downstream of the first mechanically-driven pump 14 and resides upstream of the heat exchanger 26 in the cooling and lubrication system 10. The first check valve 18 selectively permits flow of drive unit fluid 30 through its outlet and farther downstream to the heat exchanger 26. The first check valve 18 can take various types, depending on the particular application. In the embodiment of FIGS. 1-4, the first check valve 18 is a ball check valve with a ball urged close by a spring. The first check valve 18 can be set to open and permit fluid-flow at a predetermined pressure. The predetermined pressure is selected based on permitting largely drive unit fluid 30 only, as delivered from the first mechanically-driven pump 14, and not permitting and instead precluding air and a mixture of air and drive unit fluid 30 pumped from the first mechanically-driven pump 14. In this regard, it has been found that drive unit fluid 30 pumped and pressurized by the first mechanically-driven pump 14 is of a magnitude sufficient to open the first check valve 18, while air and the mixture pumped and pressurized by the first mechanically-driven pump 14 cannot open the first check valve 18 and hence the valve remains closed. The permitted drive unit fluid 30 flows downstream to the heat exchanger 26, and the precluded air and mixture flows toward the first throttle valve 22.

The second check valve 20 resides downstream of the second mechanically-driven pump 16 and resides upstream of the heat exchanger 26 in the cooling and lubrication system 10. The second check valve 20 selectively permits flow of drive unit fluid 30 through its outlet and farther downstream to the heat exchanger 26. The second check valve 20 can take various types, depending on the particular application. In the embodiment of FIGS. 1-4, the second check valve 20 is a ball check valve with a ball urged close by a spring. The second check valve 20 can be set to open and permit fluid-flow at a predetermined pressure. The predetermined pressure is selected based on permitting largely drive unit fluid 30 only, as delivered from the second mechanically-driven pump 16, and not permitting and instead precluding air and a mixture of air and drive unit fluid 30 pumped from the second mechanically-driven pump 16. In this regard, it has been found that drive unit fluid 30 pumped and pressurized by the second mechanically-driven pump 16 is of a magnitude sufficient to open the second check valve 20, while air and the mixture pumped and pressurized by the second mechanically-driven pump 16 cannot open the second check valve 20 and hence the valve remains closed. The permitted drive unit fluid 30 flows downstream to the heat exchanger 26, and the precluded air and mixture flows toward the second throttle valve 24. The permitted drive unit fluid 30 from the second check valve 20 can merge with the permitted drive unit fluid 30 from the first check valve 18 at a location that is upstream of the heat exchanger 26, as demonstrated in the figures.

Still referring to FIGS. 1-4, the first throttle valve 22 resides downstream of the first mechanically-driven pump 14, resides upstream of the first check valve 18, and resides upstream of the oil/air separator reservoir 28. The first throttle valve 22 permits flow of drive unit fluid 30, air, and a mixture of air and drive unit fluid 30 therethrough and farther downstream to the oil/air separator reservoir 28. The first throttle valve 22 can take various types, depending on the application. In the embodiment of FIGS. 1-4, the first throttle valve 22 is in the form of a restricted orifice. Similarly, the second throttle valve 24 resides downstream of the second mechanically-driven pump 16, resides upstream of the second check valve 20, and resides upstream of the oil/air separator reservoir 28. The second throttle valve 24 permits flow of drive unit fluid 30, air, and a mixture of air and drive unit fluid 30 therethrough and farther downstream to the oil/air separator reservoir 28. The second throttle valve 24 can take various types, depending on the application. In the embodiment of FIGS. 1-4, the second throttle valve 24 is in the form of a restricted orifice.

The combined first and second check valves 18, 20 and first and second throttle valves 22, 24, and their locations relative to each other and relative to the first and second mechanically-driven pumps 14, 16, as well as their respective functions, together establish as an air elimination circuit in the cooling and lubrication system 10.

The heat exchanger 26 resides downstream of the first and second mechanically-driven pumps 14, 16, resides downstream of the first and second check valves 18, 20, and resides upstream of an electric traction motor 44 of the motor vehicle drive unit. The heat exchanger 26 serves to reduce the temperature of drive unit fluid 30 that travels through it and prior to delivery of the drive unit fluid 30 to the electric traction motor 44. Cooled drive unit fluid 30 hence exits the heat exchanger 26 and flows farther downstream to the electric traction motor 44 for cooling purposes. Drive unit fluid 30 exiting the electric traction motor 44 is fed downstream for return to the drive unit sump 12. The heat exchanger 26 can take various types, depending on the particular application. In the embodiment of FIGS. 1-4, the heat exchanger 26 is of the oil-to-water cooler/heater stacked plate type.

The oil/air separator reservoir 28 collects and provisionally holds drive unit fluid 30, air, and a mixture of air and drive unit fluid 30 flowing downstream of the first and second throttle valves 22, 24 in the cooling and lubrication system 10. The oil/air separator reservoir 28 can be an integral part of the motor vehicle drive unit, or can be a discrete part that is located remote of the motor vehicle drive unit. The oil/air separator reservoir 28 serves to separate drive unit fluid 30 from air and feeds the separated drive unit fluid 30 downstream of the oil/air separator reservoir 28 to components of the motor vehicle drive unit for lubrication purposes. The components of the motor vehicle drive unit can include shafts 46, gears 48, and bearings 50, as examples. As a further option, the separated drive unit fluid 30 can be fed downstream of the oil/air separator reservoir 28 to the electric traction motor 44 for cooling purposes, serving as a secondary cooling source for the electric traction motor 44. Drive unit fluid 30 exiting the shafts 46, gears 48, and bearings 50, and that exiting the electric traction motor 44, is returned to the drive unit sump 12. The oil/air separator reservoir 28 resides downstream of the first and second mechanically-driven pumps 14, 16, resides downstream of the first and second throttle valves 22, 24, and resides upstream of the motor vehicle drive unit components and of the electric traction motor 44.

Moreover, in this embodiment, the oil/air separator reservoir 28 need not have a dedicated pump for drawing drive unit fluid 30 out of the oil/air separator reservoir 28. Rather, the separated drive unit fluid 30 is fed downstream of the oil/air separator reservoir 28 by way of gravity. Furthermore, the separated drive unit fluid 30 in the oil/air separator reservoir 28 provides a finite capacity for cooling the electric traction motor 44 when the accompanying vehicle is stopped. Since the first and second mechanically-driven pumps 14, 16 are driven by the vehicle's engine, when the vehicle engine is halted, so too are the first and second mechanically-driven pumps 14, 16. Yet even without the pumping, the separated drive unit fluid 30 contained in the oil/air separator reservoir 28 is still fed via gravity to the electric traction motor 44 for cooling. The separated drive unit fluid 30 can be fed until it is emptied from the oil/air separator reservoir 28. Lastly, overflow of drive unit fluid 30 in the oil/air separator reservoir 28 can be returned to the drive unit sump 12 via an overflow line 49 that can have a third throttle valve 51 in the form of a restricted orifice. Overflow may occur in the oil/air separator reservoir 28 when both of the first and second mechanically-driven pumps 14, 16 are pumping drive unit fluid 30 in the cooling and lubrication system 10 in certain circumstances.

As presented in the embodiment of the figures, the cooling and lubrication system 10 can have yet other components in its assembly and installation. For example, a filter assembly 52 can be furnished in the cooling and lubrication system 10.

The filter assembly 52 resides downstream of the first check valve 18 and downstream of the second check valve 20, and resides upstream of the heat exchanger 26. The filter assembly 52 has a filter 54 for capturing debris, and has a bypass valve 56 in the form of a ball check valve. Further, a pressure regulator valve 58 can be furnished in the cooling and lubrication system 10. The pressure regulator valve 58 resides downstream of the filter assembly 52 and downstream of the heat exchanger 26, and resides upstream of the drive unit sump 12. The pressure regulator valve 58 serves to relieve pressure in the cooling and lubrication system 10 and return drive unit fluid 30 to the drive unit sump 12.

Figure 4:
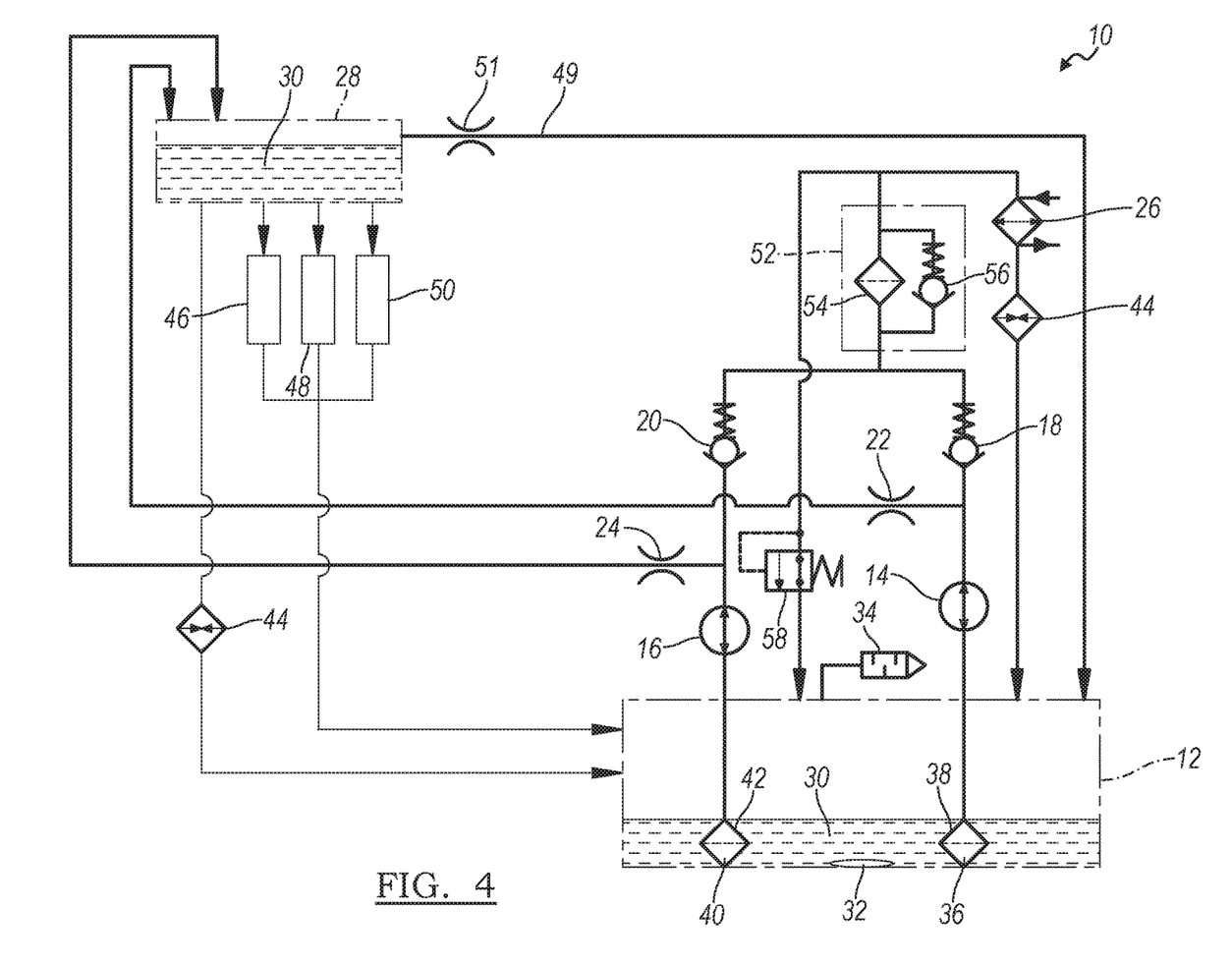
FIG. 4 is a schematic depiction of the cooling and lubrication system of FIG. 1 in a fourth state of operation.
Figure 5:
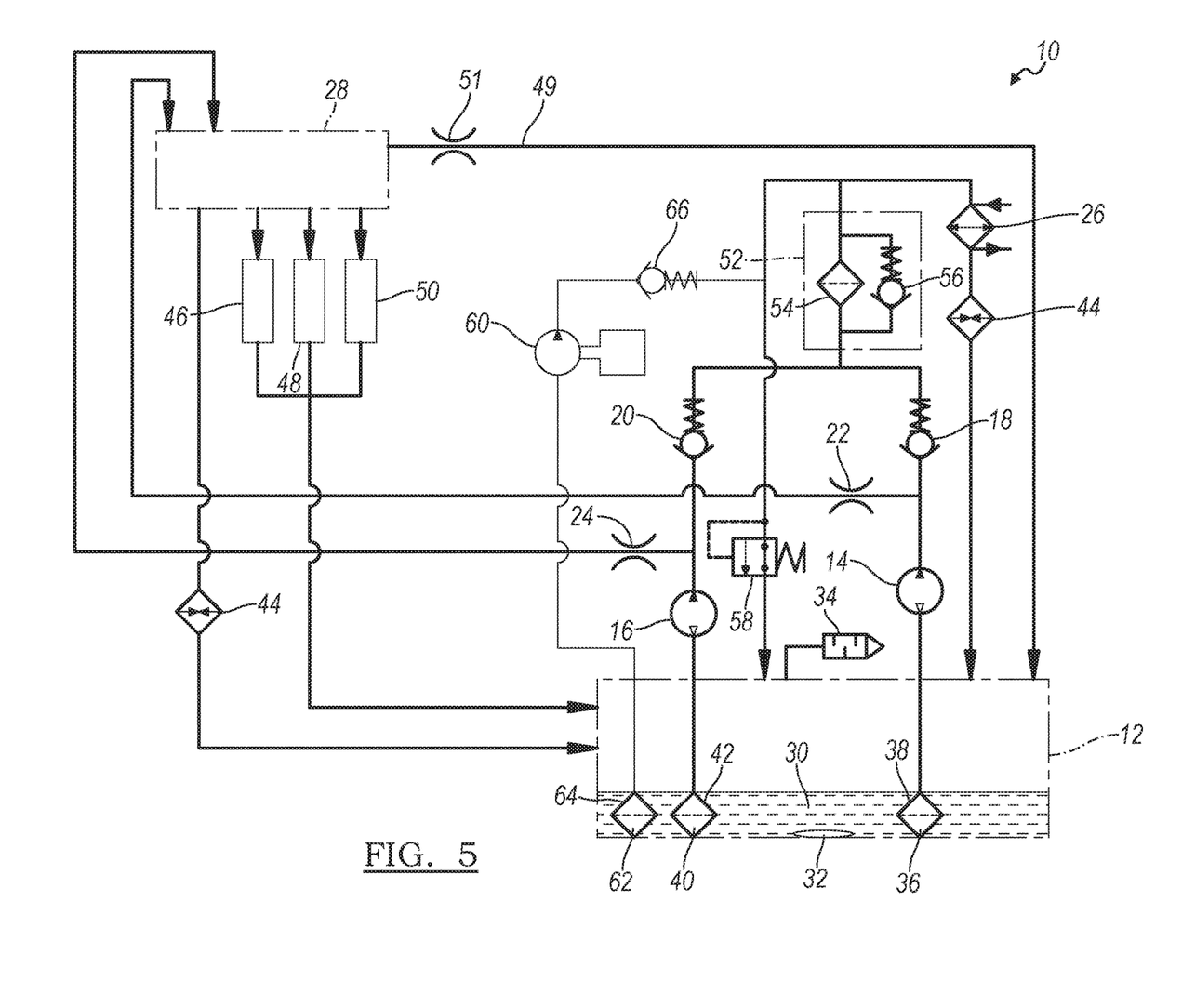
FIG. 5 is a schematic depiction of another embodiment of a cooling and lubrication system for a motor vehicle drive unit.

Referring now to FIG. 5, another embodiment of the cooling and lubrication system 10 is presented. This embodiment is similar to the embodiment of FIGS. 1-4, with the exception that the embodiment of FIG. 5 includes an electric pump 60. The electric pump 60 acts as an auxiliary pump in the cooling and lubrication system 10 for additional pumping action and augmentation when the accompanying vehicle encounters particularly demanding situations such as when the vehicle is trailering; still, the electric pump 60 can be a component of the cooling and lubrication system 10 for enhanced system performance. The electric pump 60 fluidly communicates with the drive unit sump 12 and draws drive unit fluid 30 out of the drive unit sump 12. The electric pump 60 can take various types, depending on the particular application. In the embodiment of FIG. 5, the electric pump 60 can be a 12 v BLDC driven electric pump. An inlet 62 of the electric pump 60 is situated at a lower region of the drive unit sump 12 and serves as a pick-up for drive unit fluid 30. The inlet 62 can have a screen 64 or other type of filter installed thereat. Further, in this embodiment, a third check valve 66 resides downstream of the electric pump 60 and resides upstream of the heat exchanger 26. Like the first and second check valves 18, 20, the third check valve 66 selectively permits flow of drive unit fluid 30 through its outlet and farther downstream to the heat exchanger 26. The third check valve 66 can take various types, depending on the particular application. In the embodiment of FIG. 5, the third check valve 66 is a ball check valve with a ball urged close by a spring.

Figure 1:
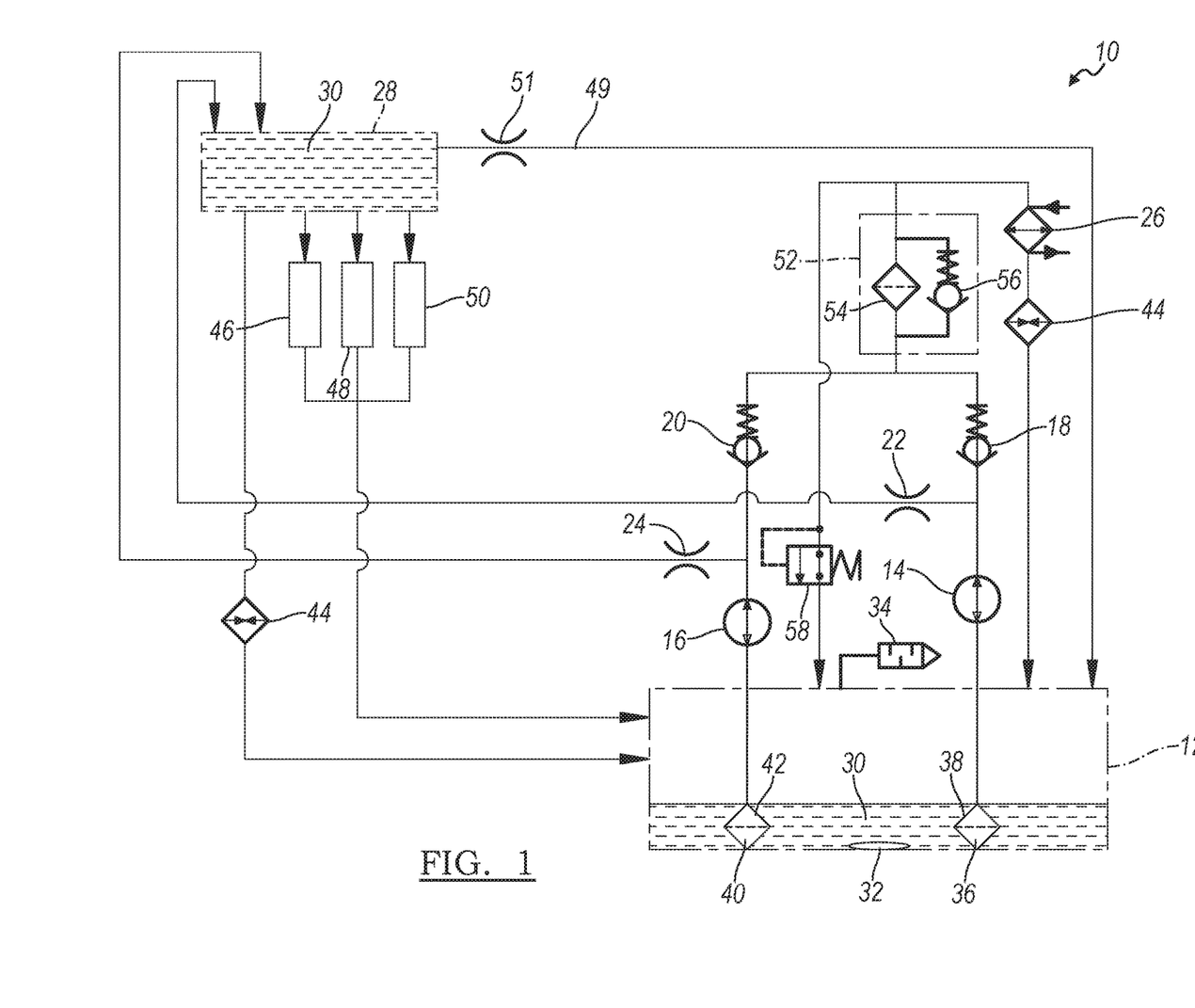
FIG. 1 is a schematic depiction of an embodiment of a cooling and lubrication system for a motor vehicle drive unit in a first state of operation.
Figure 2:
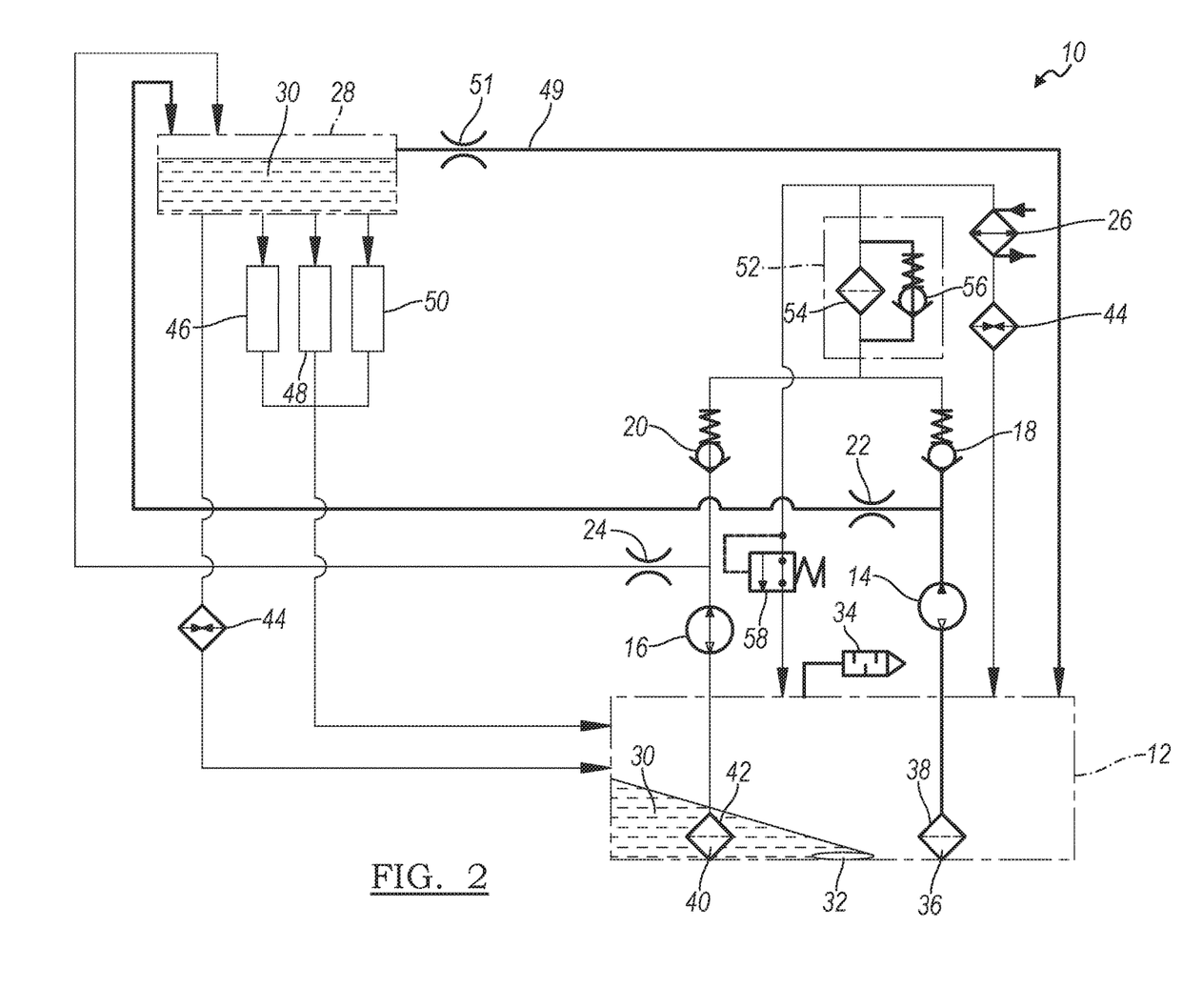
FIG. 2 is a schematic depiction of the cooling and lubrication system of FIG. 1 in a second state of operation.

FIG. 1 presents a first state of operation amid use of the cooling and lubrication system 10. Here, both of the inlets 36, 40 of the first and second mechanically-driven pumps 14, 16 are fully covered by drive unit fluid 30. The first and second mechanically-driven pumps 14, 16 draw drive unit fluid 30 from the drive unit sump 12 and downstream to the first and second check valves 18, 20, where the pressurized drive unit fluid 30 opens the first and second check valves 18, 20 and flows downstream to the filter assembly 52. Past the filter assembly 52, the drive unit fluid 30 travels through the heat exchanger 26 and then to the electric traction motor 44. The drawn drive unit fluid 30 may also travel from the drive unit sump 12, downstream to the first and second throttle valves 22, 24, and downstream to the oil/air separator reservoir 28. FIG. 2 presents a second state of operation amid use of the cooling and lubrication system 10. Here, the inlet 40 of the second mechanically-driven pump 16 is fully covered by drive unit fluid 30, while the inlet 36 of the first mechanically-driven pump 14 is completely uncovered by the drive unit fluid 30. The second mechanically-driven pump 16 draws drive unit fluid 30 from the drive unit sump 12 and downstream to the second check valve 20, where the pressurized drive unit fluid 30 opens the second check valve 20 and flows downstream to the filter assembly 52. Past the filter assembly 52, the drive unit fluid 30 travels through the heat exchanger 26 and then to the electric traction motor 44. The drawn drive unit fluid 30 may also travel from the drive unit sump 12, downstream to the second throttle valve 24, and downstream to the oil/air separator reservoir 28. Meanwhile, the first mechanically-driven pump 14 draws air from the drive unit sump 12 and downstream to the first check valve 18. Because the drawn air is incapable of opening the first check valve 18, the drawn air instead travels downstream to the first throttle valve 22 and downstream to the oil/air separator reservoir 28.

Figure 3:
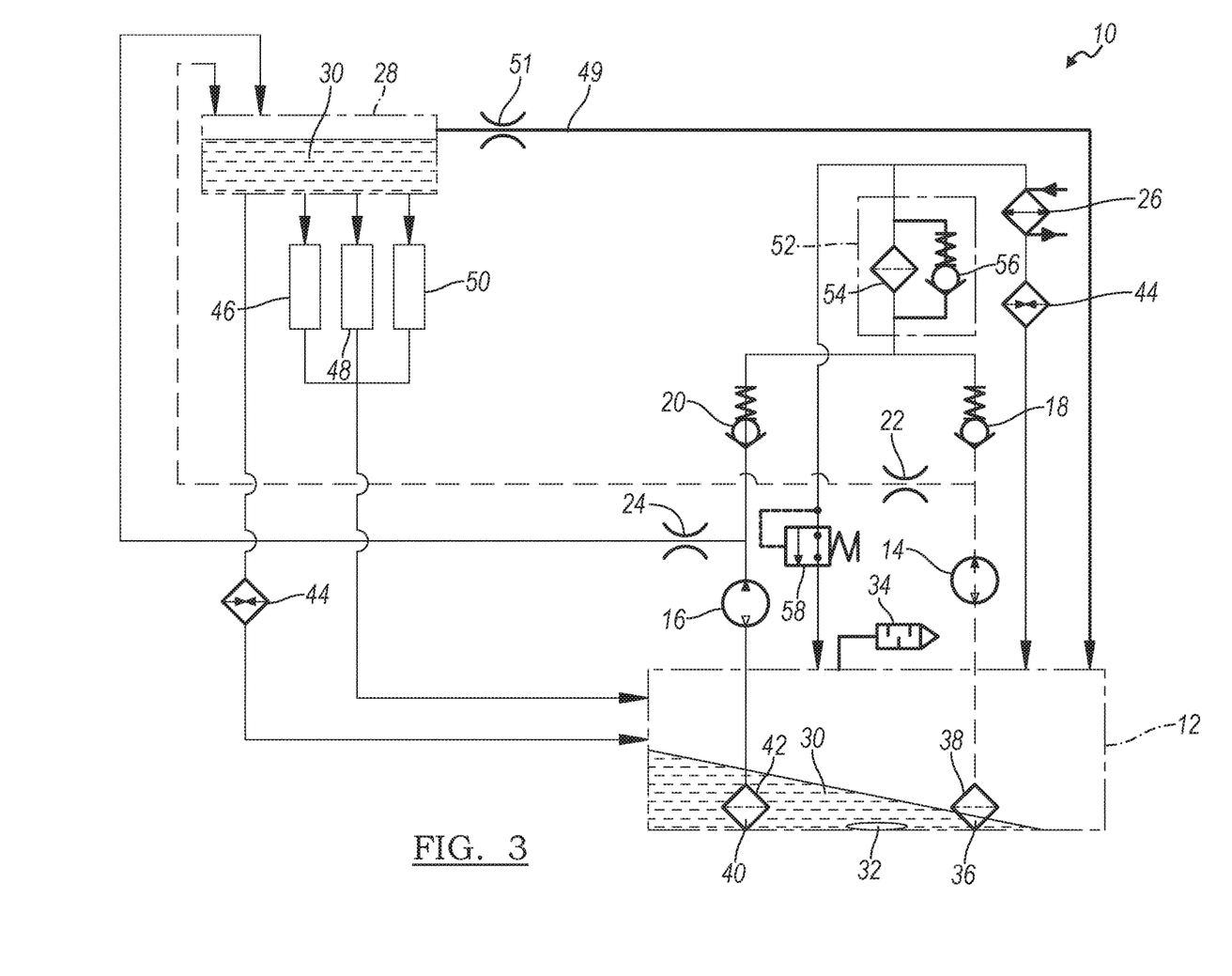
FIG. 3 is a schematic depiction of the cooling and lubrication system of FIG. 1 in a third state of operation.

FIG. 3 presents a third state of operation amid use of the cooling and lubrication system 10. Here, the inlet 40 of the second mechanically-driven pump 16 is fully covered by drive unit fluid 30, while the inlet 36 of the first mechanically-driven pump 14 is partially covered by the drive unit fluid 30. The second mechanically-driven pump 16 draws drive unit fluid 30 from the drive unit sump 12 and downstream to the second check valve 20, where the pressurized drive unit fluid 30 opens the second check valve 20 and flows downstream to the filter assembly 52. Past the filter assembly 52, the drive unit fluid 30 travels through the heat exchanger 26 and then to the electric traction motor 44. The drawn drive unit fluid 30 may also travel from the drive unit sump 12, downstream to the second throttle valve 24, and downstream to the oil/air separator reservoir 28. Meanwhile, the first mechanically-driven pump 14 draws a mixture of air and drive unit fluid 30 from the drive unit sump 12 and downstream to the first check valve 18. Because the drawn mixture is incapable of opening the first check valve 18, the drawn mixture instead travels downstream to the first throttle valve 22 and downstream to the oil/air separator reservoir 28. FIG. 4 presents a fourth state of operation amid use of the cooling and lubrication system 10. Here, the first and second mechanically-driven pumps 14, 16 are temporarily halted from pumping because the vehicle's engine is halted. Still, the separated drive unit fluid 30 contained in the oil/air separator reservoir 28 is fed via gravity to the electric traction motor 44 for cooling.

As described, the cooling and lubrication system 10 appropriates the air elimination circuit established by the first and second check valves 18, 20 and first and second throttle valves 22, 24 and utilizes it for useful cooling and lubrication purposes. For example, rather than the drawn air in the second state being deployed elsewhere, the drawn air is fed to the oil/air separator reservoir 28 along with the drawn drive unit fluid 30. Separated drive unit fluid 30 can then be utilized for lubrication and cooling, as set forth above. The attendant parasitic loss in the system that would otherwise occur is therefor lessened, and efficiencies are in turn measurably improved.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A cooling and lubrication system for a motor vehicle drive unit, the cooling and lubrication system comprising:
   a drive unit sump that holds drive unit fluid;
   a first mechanically-driven pump fluidly communicating with the drive unit sump;
   a second mechanically-driven pump fluidly communicating with the drive unit sump;
   a heat exchanger residing downstream of the first mechanically-driven pump and residing downstream of the second mechanically-driven pump; and
   an oil/air separator reservoir residing downstream of the first mechanically-driven pump and residing downstream of the second mechanically-driven pump;
      wherein, in one state of operation amid use of the cooling and lubrication system, the first and second mechanically-driven pumps draw drive unit fluid from the drive unit sump and the drawn drive unit fluid is delivered through the heat exchanger and to an electric traction motor of the motor vehicle drive unit for cooling, and the first and second mechanically-driven pumps draw drive unit fluid from the drive unit sump and the drawn drive unit fluid is delivered to the oil/air separator reservoir where separated drive unit fluid is fed downstream of the oil/air separator reservoir to components of the motor vehicle drive unit for lubrication.

2. The cooling and lubrication system for a motor vehicle drive unit of claim 1, wherein, in another state of operation amid use of the cooling and lubrication system, the first mechanically-driven pump draws air or a mixture of drive unit fluid and air from the drive unit sump, and the drawn air or mixture is delivered to the oil/air separator reservoir and the drawn air or mixture is substantially precluded from delivery to the electric traction motor.

3. The cooling and lubrication system for a motor vehicle drive unit of claim 1, wherein the second mechanically-driven pump draws drive unit fluid from the drive unit sump, and the drawn drive unit fluid is delivered through the heat exchanger and to the electric traction motor for cooling, and the drawn drive unit fluid is delivered to the oil/air separator reservoir where separated drive unit fluid is fed downstream of the oil/air separator reservoir to the components of the motor vehicle drive unit for lubrication.

4. The cooling and lubrication system for a motor vehicle drive unit of claim 1, wherein, in another state of operation amid use of the cooling and lubrication system, the first and second mechanically-driven pumps lack driving and separated drive unit fluid from the oil/air separator reservoir is fed to the components of the motor vehicle drive unit for lubrication and is fed to the electric traction motor of the motor vehicle drive unit for cooling.

5. The cooling and lubrication system for a motor vehicle drive unit of claim 1, wherein overflowed drive unit fluid of the oil/air separator reservoir is fed to the drive unit sump.

6. The cooling and lubrication system for a motor vehicle drive unit of claim 1, wherein the separated drive unit fluid is fed downstream of the oil/air separator reservoir to components of the motor vehicle drive unit for lubrication via gravity and absent a dedicated pump therefor.

7. The cooling and lubrication system for a motor vehicle drive unit of claim 1, wherein the first and second mechanically-driven pumps are the sole pumps that fluidly communicate with the drive unit sump in the cooling and lubrication system.

8. The cooling and lubrication system for a motor vehicle drive unit of claim 1, further comprising an electric pump fluidly communicating with the drive unit sump, the electric pump drawing drive unit fluid for delivery through the heat exchanger and to the electric traction motor of the motor vehicle drive unit for cooling, the electric pump operated for augmenting delivery of drive unit fluid to the electric traction motor.

9. The cooling and lubrication system for a motor vehicle drive unit of claim 1, wherein the separated drive unit fluid is fed downstream of the oil/air separator reservoir to the electric traction motor of the motor vehicle drive unit for cooling, the separated drive unit fluid being fed to the electric traction motor via gravity and absent a dedicated pump therefor.

10. The cooling and lubrication system for a motor vehicle drive unit of claim 1, further comprising:
   a first check valve residing downstream of the first mechanically-driven pump and upstream of the heat exchanger, the first check valve selectively permitting delivery of the drawn drive unit fluid through the heat exchanger and to the electric traction motor of the motor vehicle drive unit for cooling;
   a second check valve residing downstream of the second mechanically-driven pump and upstream of the heat exchanger, the second check valve selectively permitting delivery of the drawn drive unit fluid through the heat exchanger and to the electric traction motor of the motor vehicle drive unit for cooling;
   a first throttle valve residing downstream of the first mechanically-driven pump and upstream of the oil/air separator reservoir, the first throttle valve permitting delivery of drawn drive unit fluid, air, or a mixture of drive unit fluid and air to the oil/air separator reservoir; and
   a second throttle valve residing downstream of the second mechanically-driven pump and upstream of the oil/air separator reservoir, the second throttle valve permitting delivery of drawn drive unit fluid, air, or a mixture of drive unit fluid and air to the oil/air separator reservoir.

11. The cooling and lubrication system for a motor vehicle drive unit of claim 10, further comprising:
   a filter residing downstream of the first and second check valves and upstream of the heat exchanger; and
   a pressure regulator valve residing downstream of the filter and downstream of the heat exchanger, the pressure regulator valve residing upstream of the drive unit sump.

12. A cooling and lubrication system for a motor vehicle drive unit, the cooling and lubrication system comprising:
   a drive unit sump that holds drive unit fluid;
   a first mechanically-driven pump fluidly communicating with the drive unit sump;
   a second mechanically-driven pump fluidly communicating with the drive unit sump; and
   an oil/air separator reservoir residing downstream of the first mechanically-driven pump and residing downstream of the second mechanically-driven pump;
      wherein, in one state of operation amid use of the cooling and lubrication system, the first mechanically-driven pump draws air or a mixture of drive unit fluid and air from the drive unit sump and the drawn air or mixture is delivered to the oil/air separator reservoir and the drawn air or mixture is substantially precluded from delivery to an electric traction motor of the motor vehicle drive unit, and wherein the second mechanically-driven pump draws drive unit fluid from the drive unit sump and the drawn drive unit fluid is delivered through a heat exchanger and to the electric traction motor for cooling.

13. The cooling and lubrication system for a motor vehicle drive unit of claim 12, wherein drive unit fluid separated from the oil/air separator reservoir is fed downstream of the oil/air separator reservoir to components of the motor vehicle drive unit for lubrication, to the electric traction motor for cooling, or to both of the components and electric traction motor.

14. The cooling and lubrication system for a motor vehicle drive unit of claim 13, wherein the separated drive unit fluid is fed downstream of the oil/air separator reservoir via gravity and absent a dedicated pump therefor.

15. The cooling and lubrication system for a motor vehicle drive unit of claim 12, in another state of operation amid use of the cooling and lubrication system, the first and second mechanically-driven pumps draw drive unit fluid from the drive unit sump and the drawn drive unit fluid is delivered through the heat exchanger and to the electric traction motor for cooling, and the first and second mechanically-driven pumps draw drive unit fluid from the drive unit sump and the drawn drive unit fluid is delivered to the oil/air separator reservoir.

16. The cooling and lubrication system for a motor vehicle drive unit of claim 12, wherein, in another state of operation amid use of the cooling and lubrication system, the first and second mechanically-driven pumps lack driving and separated drive unit fluid from the oil/air separator reservoir is fed to components of the motor vehicle drive unit for lubrication and is fed to the electric traction motor of the motor vehicle drive unit for cooling.

17. The cooling and lubrication system for a motor vehicle drive unit of claim 12, further comprising:
a first check valve residing downstream of the first mechanically-driven pump and upstream of the heat exchanger;
a second check valve residing downstream of the second mechanically-driven pump and upstream of the heat exchanger;
a first throttle valve residing downstream of the first mechanically-driven pump and upstream of the oil/air separator reservoir; and
a second throttle valve residing downstream of the second mechanically-driven pump and upstream of the oil/air separator reservoir.

18. The cooling and lubrication system for a motor vehicle drive unit of claim 12, further comprising an electric pump fluidly communicating with the drive unit sump, the electric pump drawing drive unit fluid for delivery through the heat exchanger and to the electric traction motor of the motor vehicle drive unit for cooling.

19. A motor vehicle drive unit comprising the cooling and lubrication system of claim 12.

20. A cooling and lubrication system for a motor vehicle drive unit, the cooling and lubrication system comprising:
a drive unit sump that holds drive unit fluid;
a first mechanically-driven pump fluidly communicating with the drive unit sump;
a second mechanically-driven pump fluidly communicating with the drive unit sump;
a heat exchanger residing downstream of the first mechanically-driven pump and residing downstream of the second mechanically-driven pump;
an oil/air separator reservoir residing downstream of the first mechanically-driven pump and residing downstream of the second mechanically-driven pump;
a first check valve residing downstream of the first mechanically-driven pump and upstream of the heat exchanger;
a second check valve residing downstream of the second mechanically-driven pump and upstream of the heat exchanger;
a first throttle valve residing downstream of the first mechanically-driven pump and upstream of the oil/air separator reservoir; and
a second throttle valve residing downstream of the second mechanically-driven pump and upstream of the oil/air separator reservoir;
wherein, amid use of the cooling and lubrication system, drive unit fluid separated from the oil/air separator reservoir is fed downstream of the oil/air separator reservoir to components of the motor vehicle drive unit for lubrication, to an electric traction motor of the motor vehicle drive unit for cooling, or to both of the components and electric traction motor, wherein the separated drive unit fluid is fed downstream of the oil/air separator reservoir via gravity and absent a dedicated pump therefor.

\* \* \* \* \*